United States Patent [19]

Pidcock

[11] 4,244,670

[45] Jan. 13, 1981

[54] CONTAINER TIE DOWN

[75] Inventor: Frederick Pidcock, Kirkhill, Great Britain

[73] Assignee: Whirly Bird Services Limited, Aberdeen, Great Britain

[21] Appl. No.: 43,499

[22] Filed: May 29, 1979

[30] Foreign Application Priority Data

May 31, 1978 [GB] United Kingdom ............... 25395/78

[51] Int. Cl.³ ..................... B60P 7/08; B61D 45/00; B65D 63/00
[52] U.S. Cl. ........................... 410/103; 224/42.03 A; 224/42.39; 410/32; 410/68; 410/115
[58] Field of Search ............... 105/463, 464, 465, 473, 105/475; 224/42.03 A, 42.32, 42.38, 42.39, 318, 319, 325, 326, 327, 329, 331; 410/2, 31, 32, 43, 56, 68, 96, 100, 105, 115

[56] References Cited

U.S. PATENT DOCUMENTS

| | | | |
|---|---|---|---|
| 677,566 | 7/1901 | Eaton | 410/68 |
| 1,390,387 | 9/1921 | Rice | 224/42.39 |
| 2,210,272 | 8/1940 | Turner | 224/42.03 A |
| 3,377,044 | 4/1968 | Jackson et al. | 105/473 |
| 3,448,958 | 6/1969 | Virkki | 105/475 X |

*Primary Examiner*—Howard Beltran
*Attorney, Agent, or Firm*—Mason, Fenwick & Lawrence

[57] ABSTRACT

A cargo-carrying container having end walls and cargo tie-down devices on the end walls thereof each including a ring affixed to one of the end walls and a strap assembled to the ring, the effective length of the strap being adjustable, and further including a hook with a spring-loaded latch, the hook being fastened on the free end of the strap. The container can rest on and be secured to either a floor of a cargo space in transport craft such as a helicopter or can rest on and be secured to an underlying similar container.

1 Claim, 2 Drawing Figures

U.S. Patent

Jan. 13, 1981

4,244,670

CONTAINER TIE DOWN

The invention relates to cargo-carrying containers designed to be stowed securely e.g. in helicopters.

The object of the invention is to provide a cargo-carrying container which can either be secured to and rest on a floor of a cargo storage space or be secured to and rest on a similar underlying container which may itself be secured to and rest on the floor.

According to the invention there is provided a cargo-carrying container having two opposite end walls, a first component of a releasable fastening mounted on the outer side of each end wall, a flexible tension member mounted on each end wall and extending from such end wall to a free end of the tension member, and a second component of the releasable fastening on the free end of each tension member, the second component being complementary in forming a releasable fastening either with a component mounted in the floor of a cargo storage space when the container is resting on such floor or with the first component of a similar container underlying the container.

Figure 1:
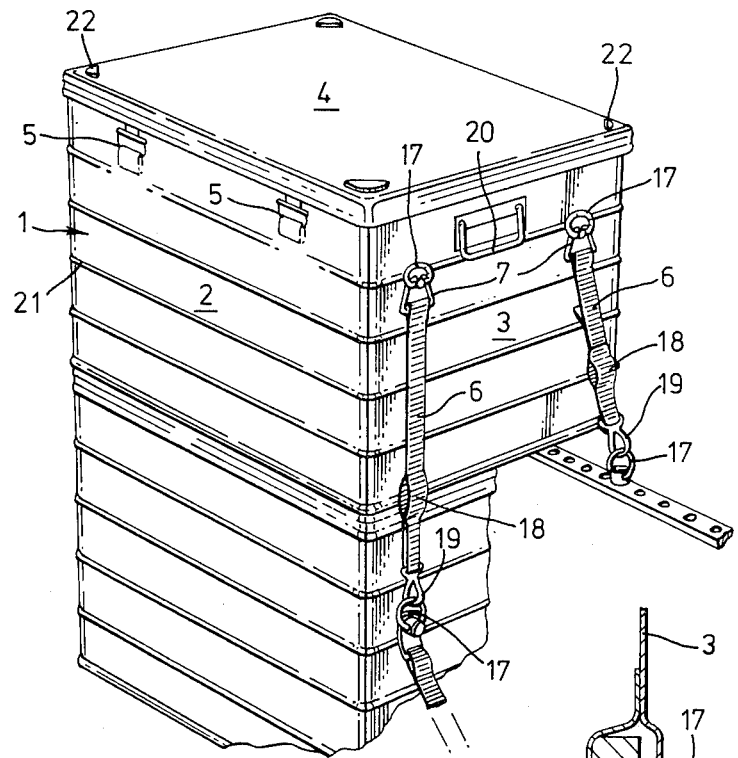
Figure 2:
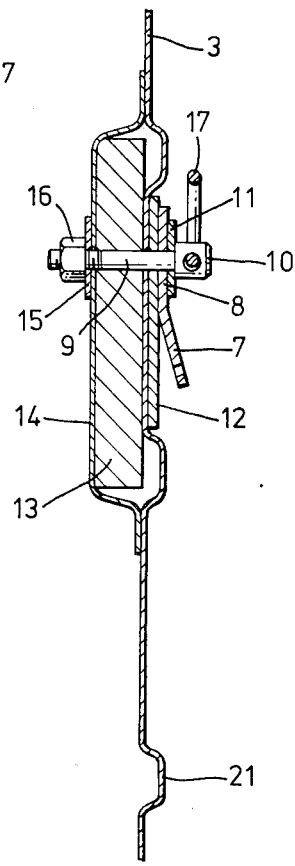

An embodiment of the invention will now be described by way of example with reference to the accompanying drawings, in which:

FIG. 1 is an oblique view of a container according to the invention and showing the container resting on and secured to a floor of a cargo storage space and also showing the container resting on and secured to a similar underlying container: and FIG. 2 is an enlarged sectional view of the mounting tension member of an end wall of the container.

A container 1 has a bottom wall, a front wall 2, a rear wall and end walls 3 and a closeable top 4 which is hinged to the rear wall and fastened by releasable clasps 5 on the front wall 2. On each end wall 2 is mounted a tension member 6 in the form of a strap having one end secured to a plate 7 which can swivel about a spacing bush 8. A threaded shank portion 9 of an eye bolt 10 extends through a washer 11, the bush 8, a fixed plate 12, the end wall 3, a timber block 13, a channel member 14 and a washer 15 and threadedly receives a nut 16. A ring 17 is retained in the head of the eye bolt 10. The strap includes a buckle 18 with a releasable jamming lever whereby the effective length of the strap can be adjusted. The free end of the strap carries a hook 19 with a spring-loaded latch.

In use the container 1 may as shown on the right hand side of FIG. 1, rest on and be secured to the floor of a cargo storage space with the hooks 19 secured to rings 17 retained in eye bolts 10 mounted on the floor and the tension members 6 tightened. It is also possible as shown on the left hand side of FIG. 1 to stack two containers and secure them together, in which case the hooks 19 of the top container are secured to the rings 17 retained in the eye bolts 10 of the bottom container. It is also possible to stack more than two containers.

When the tension members 6 are not in use the tension members 6 and the plates 7 may be swivelled about the bushes 8 so that the tension members 6 may be disposed out of the way with the hooks 19 engaged with each other or engaged with rings mounted on the front and/or rear wall of the container.

The containers are particularly designed for use in helicopters and to be easily manhandled, handles 20 being provided on the end walls 3.

The containers are made of sheet aluminium alloy with pressed ribs 21 and the corners of the top 4 are reinforced as at 22. The channel member 14 is also made of sheet aluminium alloy and is conveniently secured to the inside of the end walls 3 by pop rivets.

As shown in FIG. 1 two tension members 6 are fitted to each end wall 3. However, one tension member 6 could instead be fitted to each end wall 3 centrally under the handle 20.

I claim:

1. A cargo-carrying container of a size to be readily manhandled having two opposite end walls, a cargo tie-down device forming a releasable fastening mounted on the outer side of each end wall, each said tie-down device comprising an eye bolt fastened to the end wall having means for fastening a hook thereto and a flexible strap tension member mounted at one end on each end wall by said eye bolt and extending from such end wall to a free end of the strap tension member, and a releasable fastening hook member on the free end of each strap tension member, the hook member being complementary to the hook fastening means of the eye bolt in forming a releasable fastening with a similar eye bolt of the tie-down devices of a similar container underlying the first-mentioned container. wherein the eye bolt hook fastening means is a rigid ring member supported by the eye bolt, each of said flexible strap tension members is a strap including buckle means for adjustment of the effective length of the strap, and said hook member on the free end of the strap includes a spring-loaded latch for releasably closing the hook when assembled with one of said ring members.

* * * * *